(12) United States Patent
Vedaraj et al.

(10) Patent No.: US 10,979,578 B2
(45) Date of Patent: Apr. 13, 2021

(54) METHODS AND SYSTEMS FOR SENDING AN EMAIL ALONG WITH A SCANNED DOCUMENT FROM A MULTI-FUNCTION DEVICE

(71) Applicant: XEROX CORPORATION, Norwalk, CT (US)

(72) Inventors: Ashok Jason Vedaraj, Chennai (IN); Thamizh Priyai Thamizhanandan, Chennai (IN); Iswarya Shanmuganathan, Thuraiyur (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/512,707

(22) Filed: Jul. 16, 2019

(65) Prior Publication Data

US 2021/0021718 A1 Jan. 21, 2021

(51) Int. Cl.
| | |
|---|---|
| *H04N 1/387* | (2006.01) |
| *H04N 1/00* | (2006.01) |
| *H04L 12/58* | (2006.01) |
| *G06F 40/174* | (2020.01) |

(52) U.S. Cl.
CPC ....... *H04N 1/00212* (2013.01); *G06F 40/174* (2020.01); *H04L 51/08* (2013.01); *H04N 1/00225* (2013.01); *H04N 2201/0094* (2013.01)

(58) Field of Classification Search
CPC .......... H04N 1/00212; H04N 1/00225; H04N 1/00209; H04N 2201/3208; G06F 40/174
USPC .............................. 358/1.18, 1.15, 403, 407
See application file for complete search history.

(56) References Cited

U.S. PATENT DOCUMENTS

| | | | |
|---|---|---|---|
| 2005/0195446 A1* | 9/2005 | Kasatani | H04N 1/00222 358/402 |
| 2018/0210935 A1* | 7/2018 | Yazicioglu | G06F 40/186 |

* cited by examiner

*Primary Examiner* — Jamares Q Washington
(74) *Attorney, Agent, or Firm* — Jones Robb, PLLC

(57) ABSTRACT

Disclosed herein are methods and systems for sending an email along with a scanned document from a multi-function device. The method includes retrieving at least one email file from at least one of an external storage device and a file location, wherein a user creates the at least one email file at a computing device; automatically filling an email content, and one or more recipients from the at least one email file in an email job; displaying, via a user interface, the email job includes the auto-filled email content including an email subject and an email body, and the one or more recipients; scanning, at least one document; automatically attaching the at least one scanned document to the email job; and sending the email job including the email content along with the at least one scanned document to the one or more recipients directly through the multi-function device.

23 Claims, 14 Drawing Sheets

METHODS AND SYSTEMS FOR SENDING AN EMAIL ALONG WITH A SCANNED DOCUMENT FROM A MULTI-FUNCTION DEVICE

TECHNICAL FIELD

The presently disclosed subject matter relates to methods and systems for sending an email along with a scanned document from a multi-function device.

BACKGROUND

Typically, a user uses a computing device for sending or receiving emails using an email client such as MS Outlook, etc. Sometimes, the user requires to attach a document which is to be scanned. In such cases, the user uses a multi-function device to scan the document and a scanned document is generated upon scanning. The user can send the created email and the scanned document via two ways.

One way is that the user sends the created email to recipients through the computing device and sends the scanned document attached in another email using an email app in the multi-function device. In such scenarios, the recipients receive two separate emails, i.e., one email with required content and other with the scanned document. This is not always relevant and easy to follow up or manage at both ends, i.e., the recipients and the sender end. Also, it is inconvenient to track two different emails for one subject, both—for the recipients and the sender. And it unnecessary increases the mailbox side at the recipients' end. Moreover, when the user sends the scanned document through the multi-function device, the user does not have an option to edit/work on a detailed mail body at the multi-function device itself or if it is available, it is not that easy to work on the multi-function device because of a small user interface.

The second way is that user sends back the scanned document to his email and accesses the scanned document through this computing device. The user downloads the scanned document from his email on his computing device. The user attaches the downloaded scanned document in the created email and sends the email with the attached scanned document to the one or more recipients. This way, the recipients receive one email including, both—the attached scanned document and the email content. In such cases, the user suffers as he has to do to and fro between the multi-function device and the computing device. Hence, in light of the above limitations, there arises a need for improvised methods and systems.

SUMMARY

According to aspects illustrated herein, there is provided a method for sending an email along with a scanned document through a multi-function device. The method includes storing at least one email as an at least one email file in at least one of an external storage device and a file location, wherein the at least one email is created by a user at a computing device; retrieving, by a controller, the at least one email file from the at least one of an external storage device and a file location; automatically filling, by an email module, an email content, and one or more recipients from the at least one email file in an email job; displaying, via a user interface, the email job comprising the auto-filled email content comprising an email subject and an email body, and the one or more recipients; scanning, by a scanner, at least one document; automatically attaching, by the email module, the at least one scanned document to the email job; and sending, by the email module, the email job comprising the email content along with the at least one scanned document to the one or more recipients directly through the multi-function device.

According to further aspects, there is provided a multi-function device. The multi-function device includes a controller to retrieve at least one email file from at least one of an external storage device and a file location, wherein a user creates the at least one email file at a computing device; a scanner to scan at least one document; an email module to automatically fill an email content and one or more recipients from the at least one email file in an email job; automatically attach the at least one scanned document to the email job; and to send the email including the email content along with the at least one scanned document to the one or more recipients; and a user interface to display the email job including the auto-filled email content including an email subject and an email body, and the one or more recipients.

According to additional aspects, a multi-function device enabling a user to directly send a scanned document along with a required email, by storing at least one email as an at least one email file in at least one of an external storage device and a file location, wherein the at least one email is created by a user at a computing device; receiving a selection of a pre-defined option to automatically fill at least one email file in a user interface of the multi-function device; retrieving the at least one email file from at least one of an external storage device and a file location; automatically filling an email content and one or more recipients from the at least one email file in an email job; displaying the email including the auto-filled email content and the one or more recipients; receiving at least one document for scanning; scanning the at least one document; automatically attaching the at least one scanned document to the email job including the email content and the one or more recipients; and sending the email job including the email content with the attached at least one scanned document to the one or more recipients, without requiring the user to bounce back between the multi-function device and the computing device.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
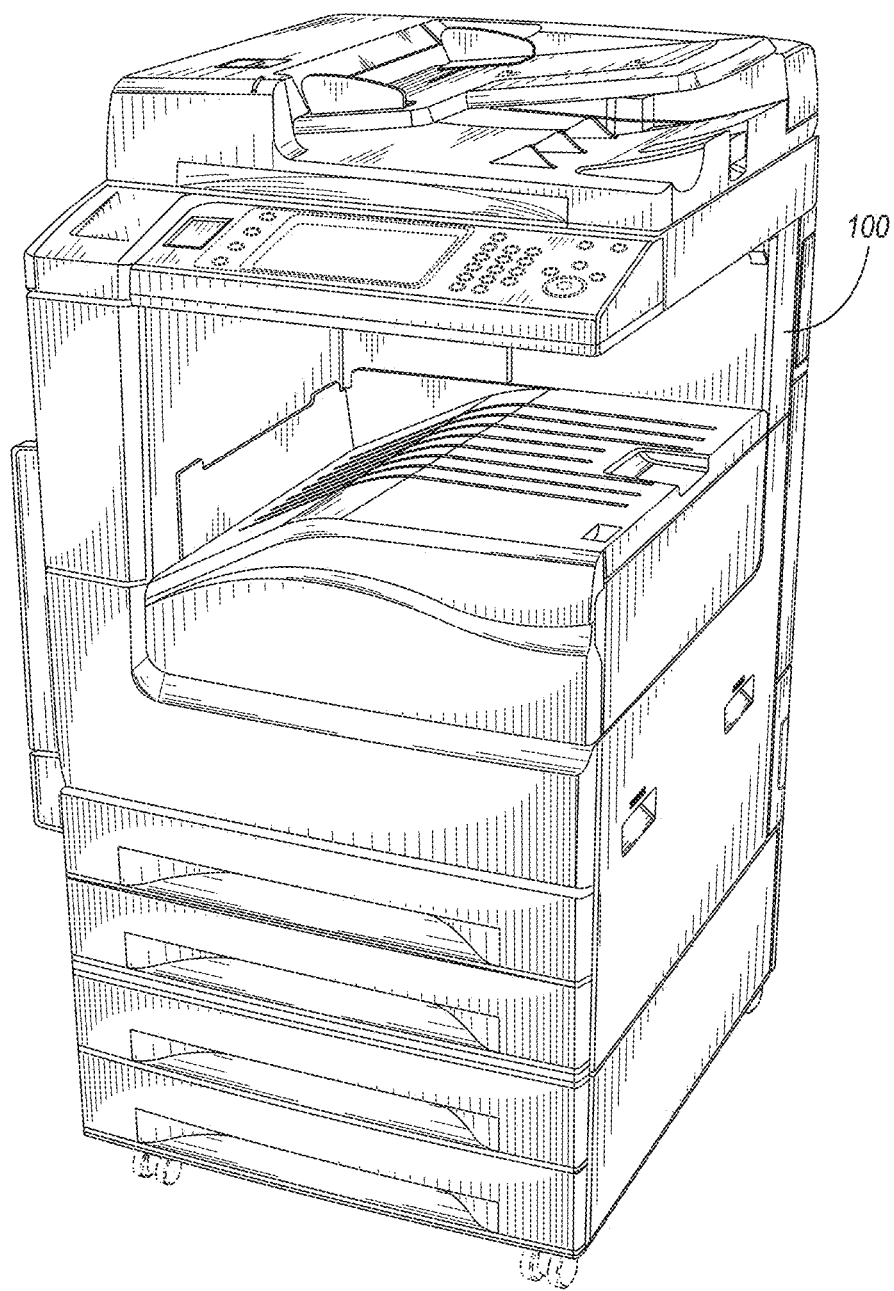
FIG. 1 shows an exemplary physical multi-function device (MFD), in accordance with an embodiment of the present disclosure.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below.

A "multi-function device" is a single device or a combination of multiple devices to perform more than one function such as, but not limited to, scanning, printing, copying, cutting, imaging, and so forth. The multi-function device may include software, hardware, firmware, and combination thereof. In the context of the current disclosure, the multi-function device (i) accepts an email in the form of an email file including an email content and one or more recipients either from a storage device or from a file location, (ii) scans a document, and (iii) sends the email including the email content with the attached scanned document to the one or more recipients.

An "email file" refers to an email stored as a file in a suitable pre-defined format including all known file formats and/or later developed formats. The email file includes an email content including an email subject and an email body, and one or more recipients. The email file may also include one or more attachments/documents attached or other kind of email content. Some examples of the pre-defined format of the email file includes ".msg" format, ".mbox" format, ".eml" format, etc. Other formats of the email file may be implemented The term "computing device" refers to a device that the user typically uses for his day to day work/business. Examples of the computing device include, but are not limited to, a personal computer, a laptop, a mobile phone, a tablet, a Personal Digital Assistant (PDA), a smart-phone or any other device capable of data communication. For example, the user uses the computing device for sending and/or receiving emails.

Overview

The present disclosure discloses methods and systems for sending emails having required email content (email subject and email body) along with a scanned document directly through a device such as a multi-function device. The methods and systems enable a user to send the email with the required content and the scanned document directly through the multi-function device such that the user does not require to go back to his computing device after scanning the document. The methods and systems further enable the user to send a single email with the email content and the scanned document as an attachment instead of two separate emails as in known solutions. The methods and systems further program the multi-function device such that the multi-function device identifies and understands the email file in various formats, accepts various formats of the email file and handles it accordingly. The methods and systems enable the user to access the email created by the user at the multi-function device in the form of the email file and the email is sent with the scanned document, after scanning the document.

FIG. 1 illustrates an exemplary physical multi-function device (MFD) 100 according to an embodiment of the present disclosure. The multi-function device 100 may be used by a number of users for one or more services such as email, scan, workflows, copy, print, fax, or the like. The multi-function device 100 may be a single device or a combination of multiple devices or modules to perform more than one function such as, but not limited to, scanning, printing, imaging, and so forth. The multi-function device 100 may include software, hardware, firmware, and a combination thereof. As shown, the multi-function device 100 is a standalone device, but the multi-function device 100 may be connected to other devices via a network (although not shown), such as one or more computing devices, other multi-function devices or the like. The network may be a wired network, a wireless network or a combination of these. The network may be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such networks. The network may either be a dedicated network or a shared network, which represents an association of the different types of networks that use a variety of protocols. The network may include network devices, such as network switches, hubs, routers, HBAs, for providing a communication link between the multi-function device 100 and other connected devices/systems such as the computing device.

In context of the present disclosure, the multi-function device 100 provides access to an email created by a user at his computing device such that the email created with the required content is sent with the scanned document to one or more recipients. The multi-function device 100 provides access to the at least one email file via a user interface of the multi-function device 100 using an email app. The multi-function device 100 receives the email created by the user in the form of an email file, recognizes the email file or identifies the format of the email file, opens or displays the email file an as email job using an email app. The multi-function device 100 opens and displays the email file to the user via a user interface of the multi-function device 100. The multi-function device 100 then scans a document submitted by the user to the multi-function device 100 and generates a scanned document. Finally, after scanning, the multi-function device 100 automatically attaches the scanned document to the email job and sends the email job along with the scanned document to one or more recipients. Various formats of the email file may be but not limited to .msg format, .mbox format, .eml format, etc.

For simplicity, various terms are discussed. The term "email" created at the computing device is the email to be sent to one or more recipients. The email is saved as a draft at the computing device. The email is further saved at a file location or in a USB as an email file in various formats as discussed above. The term "email job" refers to the email file when opened at the multi-function device 100 using an email app. The terms email, email file, email job may be used interchangeably, and all include email content and the one or more recipients. The email content may include an email subject, an email body, an attachment or the like. The "user" can be any user who has access to the multi-function device 100 and uses the computing device for his day to day tasks.

Figure 2:
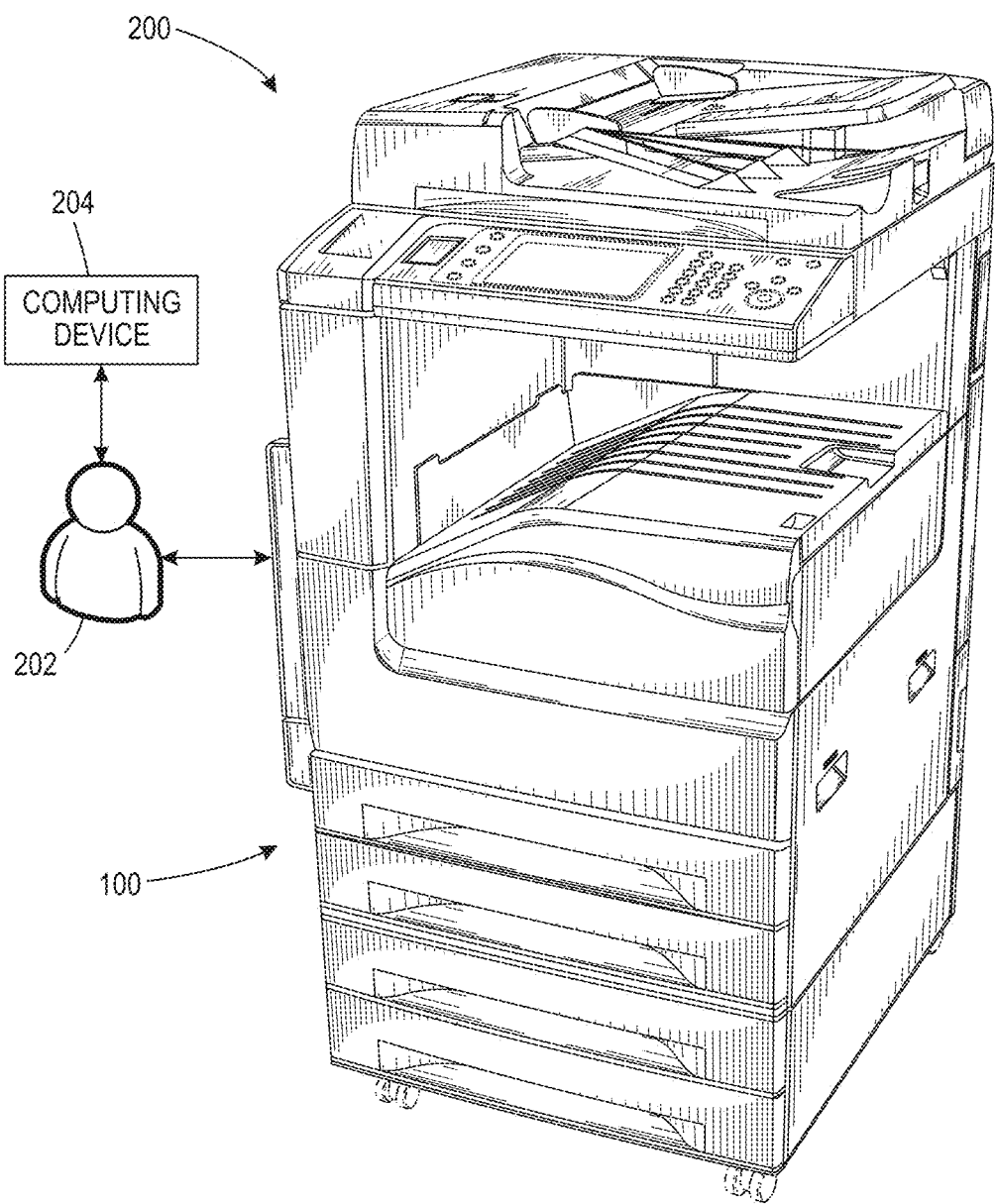
FIG. 2 shows an exemplary environment in which various embodiments of the disclosure can be practiced.

FIG. 2 shows an exemplary environment 200 in which various embodiments of the disclosure can be practiced. As shown, the environment 200 includes the multi-function device 100, communicatively coupled to a computing device 204 via a suitable network (although not shown) as known or later developed network. Few examples of the network may include such as, but are not limited to, a personal area network (PAN), a local area network (LAN), a Bluetooth® network, a storage area network (SAN), a home area network (HAN), the Internet®, a campus area network (CAN), a wide area network (WAN), a metropolitan area network (MAN), a virtual private network (VPN), an enterprise private network (EPN), the Internet, a global area network (GAN), public switched telephone network (PSTN), cellular telephone network, or any other terrestrial or satellite network appropriate. Examples of the computing device 204 may include, but are not limited to, a personal computer, a laptop, a smart phone, a mobile phone, a tablet computer, a PDA (Personal Digital Assistant), and so forth. The computing device 204 may be any electronic device that is used for sending and/or receiving emails.

Typically, a user 202 uses the computing device 204 for his day to day tasks. For example, the user 202 uses the computing device 204 for emails, surfing, work, etc. An email client runs on the computing device 204. The email client may be any electronic mail platform or application enabling the user 202 to send and/or receive emails. Few examples of the email client include, but are not limited to, Microsoft Outlook, Gmail, Yahoomail, Hotmail, Rediff mail, and so forth. Using the email client, the user 202 creates emails, sends and/or receives emails. In some embodiments, the user 202 accesses the email client via a web browser at the computing device 204.

Here, the user 202 prepares or creates an email with the required content to be sent to one or more recipients. The user 202 creates the email at the computing device 204. The email content includes an email subject and an email body. The prepared email is further stored as an email file such that the email file can be accessed by the multi-function device 100. The email file can be stored in at least one of an external storage device and a file location. Examples of the external storage device include, but are not limited to, a USB device, an external hard disk, etc. The file location may be a shared file location that can be accessed using suitable protocols such as File Transfer Protocol (FTP), Server Message Block (SMB) or the like. The email content includes an email subject and an email body.

The multi-function device 100 receives the email file either through the external storage device or through the file location, identifies the email file and presents or displays the email file via a user interface of the multi-function device 100. Before displaying, the multi-function device 100 launches the email app and opens the email file as an email job in the user interface of the multi-function device 100. The multi-function device 100 scans a document as placed by the user 202 and generates a scanned document. The multi-function device 100 then automatically attaches the scanned document with the email job and sends the email job to the recipients. The email job includes the required email content such as email subject and email body. In this manner, the user 202 is enabled to send the email along with the scanned document directly from the multi-function device 100.

Figure 3:
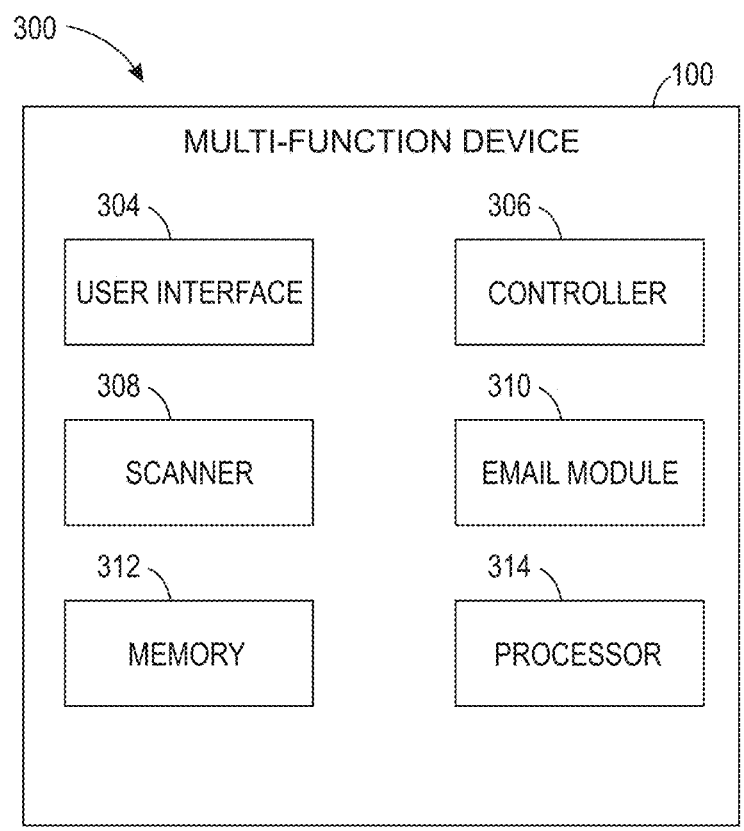
FIG. 3 is a block diagram illustrating various system components of the multi-function device, in accordance with an embodiment of the present disclosure.

FIG. 3 is a block diagram 300 illustrating various components of the multi-function device 100, in accordance with an embodiment of the present disclosure. As shown, the multi-function device 100 includes a user interface 304, a controller 306, a scanner 308, an electronic mail (email) module 310, a memory 312 and a processor 314. The memory 312 store a number of files, instructions, user data, and so forth. Each of the components 304-314 is connected to each other via a conventional bus or a later developed protocol. Further, each of the components 304-314 communicates with each other for performing various functions of the current disclosure. Reference to other figures may be made while discussing FIG. 3.

As discussed with reference to FIG. 2, the user 202 creates an email using an email client running on the computing device 204. The email includes an email subject, an email body and one or more recipients. The email represents the email to be sent to the one or more recipients. After creating the email, the user 202 stores the email in one of an external storage device connected to the computing device 204 or in a file location. Various examples of the external storage device include such as a USB (Universal Serial Bus) device, an external hard disk, and so forth. The user 202 stores the email file at the file location using any suitable existing protocols or later developed protocols. Examples of the protocols include but are not limited to a server message block (SMB) protocol, and a file transfer protocol (FTP). The file location may be of a server or any other device connected to the multi-function device 100. The email is stored as an email file in various formats. Various formats of the email file may include a .msg format, a .mbox format, and a .eml format, and all known and later developed formats. The email file includes the email content and the one or more recipients. The email content further includes an email subject and an email body.

The user 202 accesses the multi-function device 100 via the user interface 304. Before providing access to the multi-function device 100, the multi-function device 100 authenticates the user 202. The user 202 submits login credentials through the user interface 304 of the multi-function device 100. The login credentials may include biometrics of the user 202 like a finger scan, thumb scan, face scan, etc., a card scan, a code scan, username, password, user id and so forth. Based on the login credentials, the user 202 is allowed to access the user interface 304 of the multi-function device 100. The multi-function device 100 displays the user interface 304 to the user 202.

The user interface 304 displays or provides a pre-defined option such as "Load Email" option to the user 202. The user 202 selects the pre-defined option to load the email file in the user interface 304 as an email job. The controller 306 receives a selection of the pre-defined option. Upon receiving the selection of the "Load Email" option from the user 202, the user interface 304 further provides at least two options to the user 202 for selecting the email file. The at least two options may be "an external storage device" option and "a file location" option. The external storage device option allows the user 202 to select the email file from the external storage device. In such cases, the user 202 connects the external storage device to the multi-function device 100 via a suitable port. The user 202 selects the external storage device option if the email file is stored in the external storage device. The file location option allows the user to select the email file stored at the file location. In such cases, the user 202 provides a path or location of the file for accessing the email file from the file location. The user 202 selects the file location option if the email file is stored in the file location accessible by the multi-function device 100. The user 202 selects one of the at least two options via the user interface 304. For example, when the user 202 selects the external storage device option, then the user interface 304 opens a screen showing contents of the external storage device, like a USB device, connected to the multi-function device 100 opens up, allowing the user 202 to select the email file. The user 202 selects the at least one email file. Similarly, when the user 202 selects the file location option, then the user interface 304 opens a screen to allow the user 202 to either enter a file location address or browse to the file location. Based on the email file, the user 202 selects an option of the at least two options.

Based on a selection from the user 202, the controller 306 proceeds further. The controller 306 retrieves the email file either from the external storage device or from the file location. The email file is retrieved based on the option selected by the user 202. For example, if the external storage device option is selected by the user 202, the controller 306 retrieves the email file from the external storage device. In another example, if the file location option is selected by the user 202, the controller 306 retrieves the email file from the file location. Before retrieving, the controller 306 first identifies the format of the email file and automatically opens the email file using an email app. After retrieving, the controller 306 passes the retrieved email file to the email module 310.

The email module 310 automatically fills or loads the retrieved email file as an email job using the email app. The email module 310 auto fills the email content and the one or more recipients from the email file in the email job. The auto filled email content and the one or more recipients in the email job are displayed to the user 202 via the user interface 304. The email content includes the email subject and the email body. The email file may also include attachments (different from attachments obtained after scanning) or other type of email content. In such cases, the attachments are automatically uploaded/added to the email job at the multi-function device 100.

In some implementations, the user 202 is allowed to update the one or more recipients via the user interface 304 of the multi-function device 100. In such implementations, the user interface 304 receives input from the user 202 for updating the one or more recipients. Based on the input from the user 202, the email module 310 updates the one or more recipients. For example, the user 202 may add more recipients, delete one or more recipients etc. Similarly, the user 202 is allowed to update the email content via the user interface 304 of the multi-function device 100. In such implementations, the user interface 304 receives input from the user 202 for updating the email content. Based on the input from the user 202, the email module 310 updates the email. For example, the user 202 may add email content—may be in the email body and/or in the email subject and so on. In another example, the user 202 may delete email content—may be from the email body and/or from the email subject.

The user 202 then places a document for scanning. In an exemplary scenario, the user 202 places the document in either DADH (duplex automatic document handler) or a platen of the multi-function device 100. The scanner 308 receives the submitted document and scans the document. The scanner 308 generates the scanned document. The scanner 308 passes the scanned document to the email module 310.

The email module 310 receives the scanned document and automatically attaches the scanned document to the email job. The email job includes the auto-filled email content including the email subject and the email body and the one or more recipients. The email module 310 sends the email including the email content along with the attachment including the scanned document to the one or more recipients. The email module 310 sends the email along with the scanned document based on an input from the user 202 such as a send command for sending the email. Finally, the email along with the scanned document is sent through the multi-function device 100.

In some implementations, processing of the email file is discussed as follows. To load the email file using the email app, the email module 310 or the processor 314 identifies a file extension or a pre-defined format of the email file and based on the identification, the email module 310 or the processor 314 executes further commands to process the email file. The email module 310 or the processor 314 sends a command to process the email file by a service such as a distribution service. The distribution service may send an RPC (Remote Procedure Call) or an API call to the user interface 304 with details of email job parameters. For example, an exemplary code to inherit existing email job struct/unions, and to inherit new attributes that can be added in new struct is as follows:

```
struct DistributionSvcImportEmailJob
{
JobId clientInfold;
Boolean jobCreated;
DistributionSvcJobAVPSeq jobAvpSeq;
Inherit exiting email job
<Extension> yes </Extension>s
<ExtType>msg</ExtType>
<LoadOption>usb</LoadOption>
<LoadAction>Add</LoadAction>
New attributes can be added in
};
```

On receiving RPC call(s) from the distribution service, the user interface 304 adds and shows the selected email/Job. As a normal scan to email job, it is processed and ready to be sent to a server. Once the scanning of the at least one document is done, scanned document or scanned document images are added to the email job (or the email) and the email module 310 (e.g., a simple mail transfer protocol client) sends the email including the email content and the scanned document as an attachment to the one or more recipients.

Figure 4A:
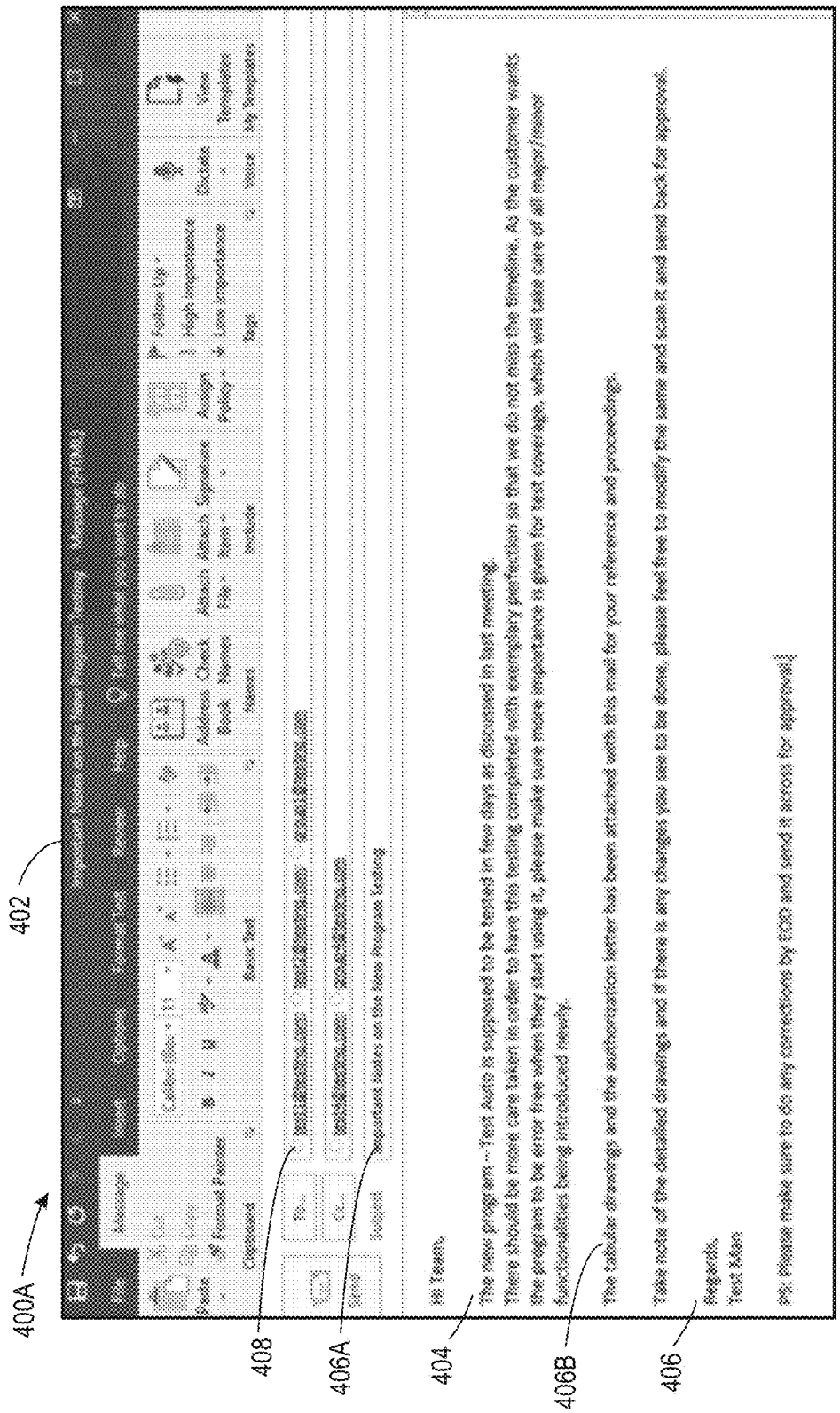
FIGS. 4A-4I show various screenshots for sending an email having an attached scanned document, from the multi-function device, in accordance with an embodiment of the present disclosure.

FIGS. 4A-4I show various screenshots 400A-400I for sending an email along with a scanned document directly from the multi-function device (MFD) 100, in accordance with an embodiment of the present disclosure. The screenshot 400A of FIG. 4A, illustrates an email client 402, such as MS Outlook running on the computing device 204 of the user 202. The user 202 uses the email client 402 for drafting/creating an email 404 including an email content 406 and one or more recipients 408. The email content 406 includes an email subject 406a and an email body 406b. The email content 406 may further include more details although not indicated here. In this manner, the user 202 creates the email 404 using the email client 402, at his computing device 204.

Figure 4B:
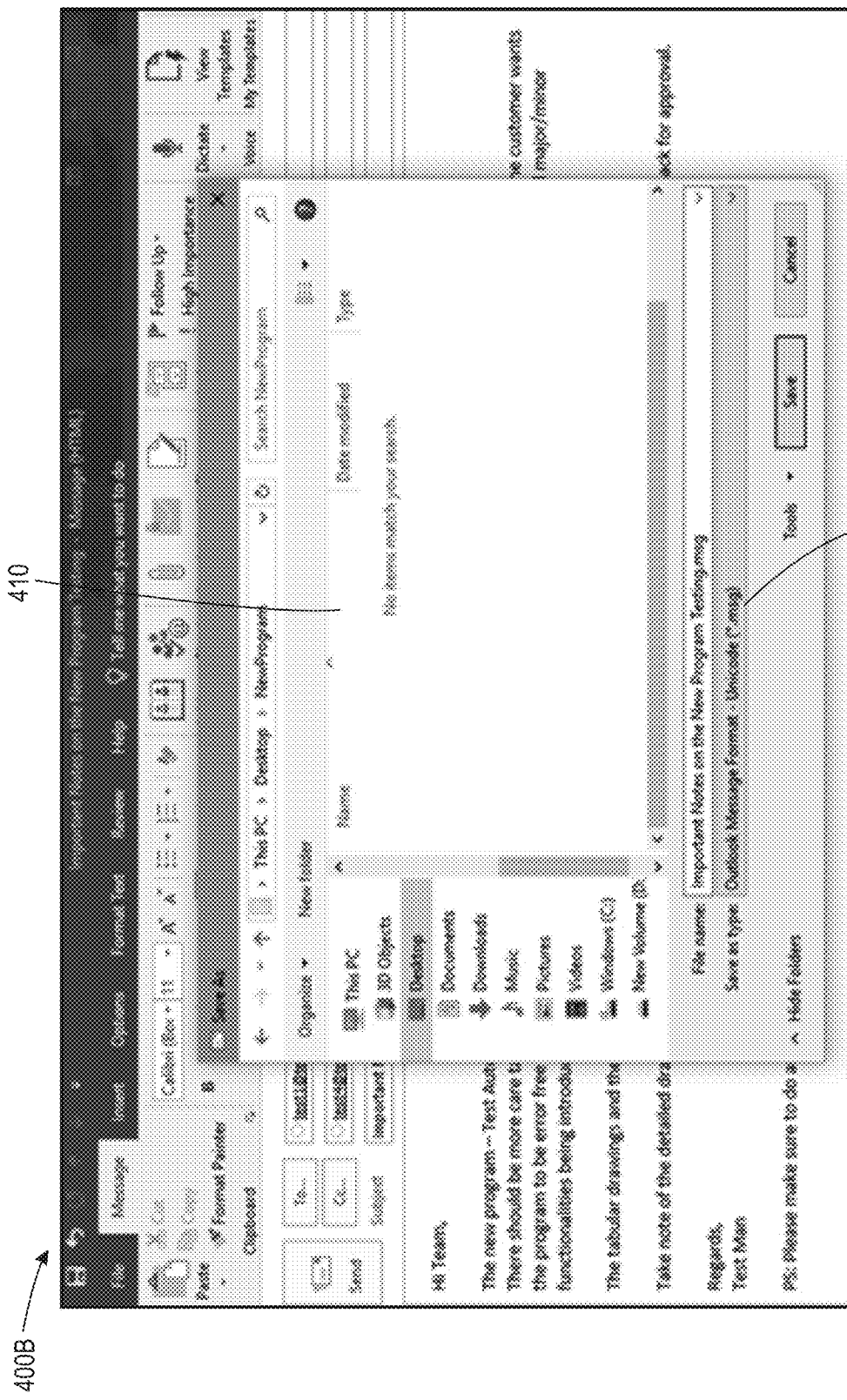
Figure 4C:
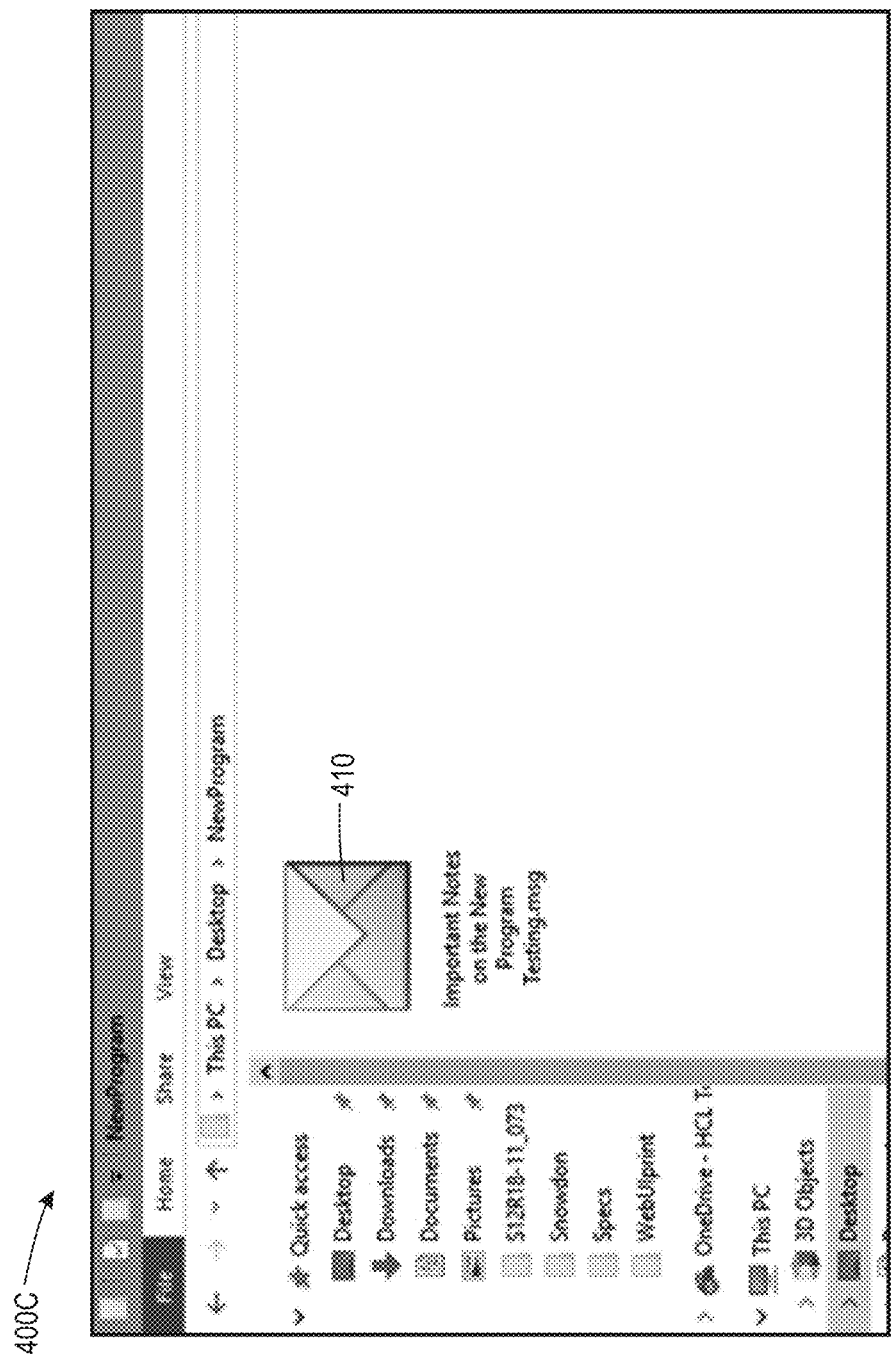

The screenshot 400B of FIG. 4B illustrates the email 404 created above is saved as an email file 410 in a pre-defined format such as ".msg" format (indicated as 409). The email file 410 includes the email content 406 and the one or more recipients 408. The screenshot 400C of FIG. 4C shows the saved email file 410 of ".msg" format, wherein the email file is saved in a local desktop folder (named as "new program" 411) at the computing device 204 of the user 202.

Figure 4D:
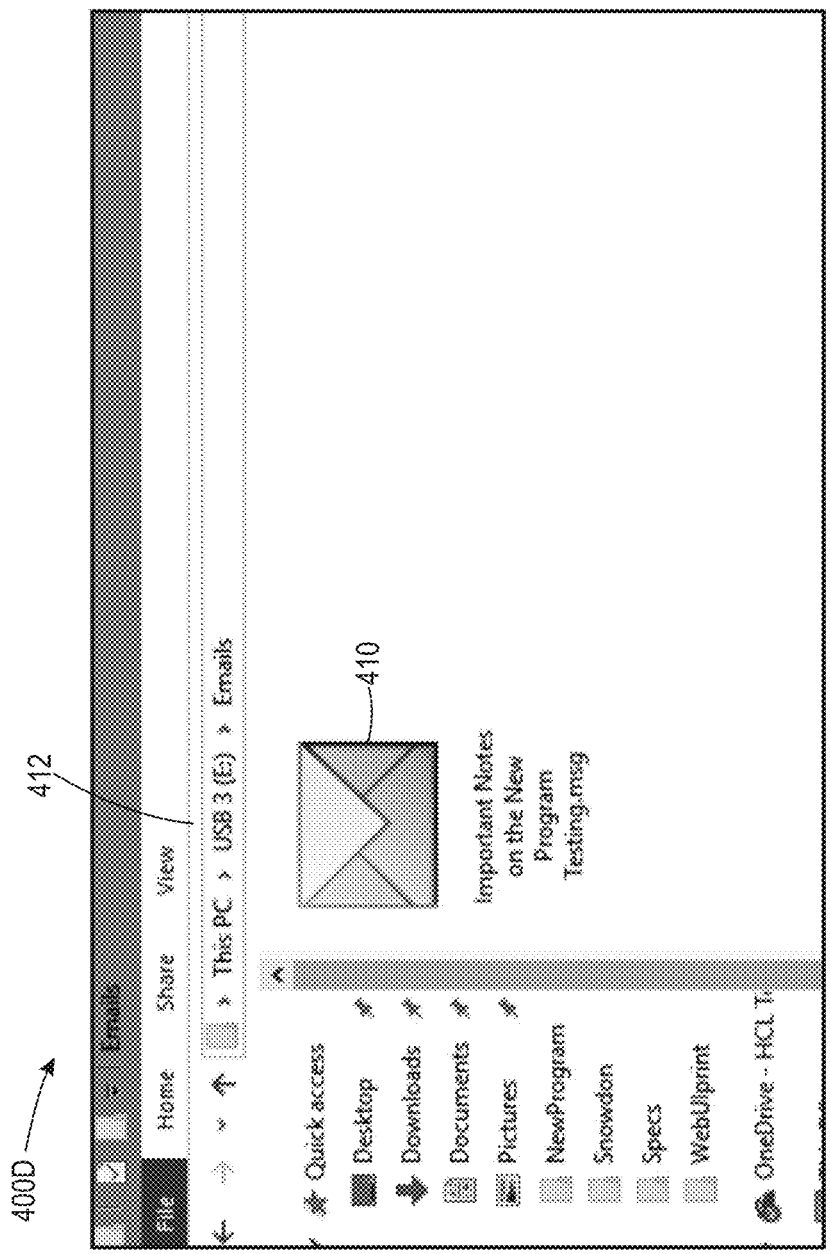
Figure 4E:
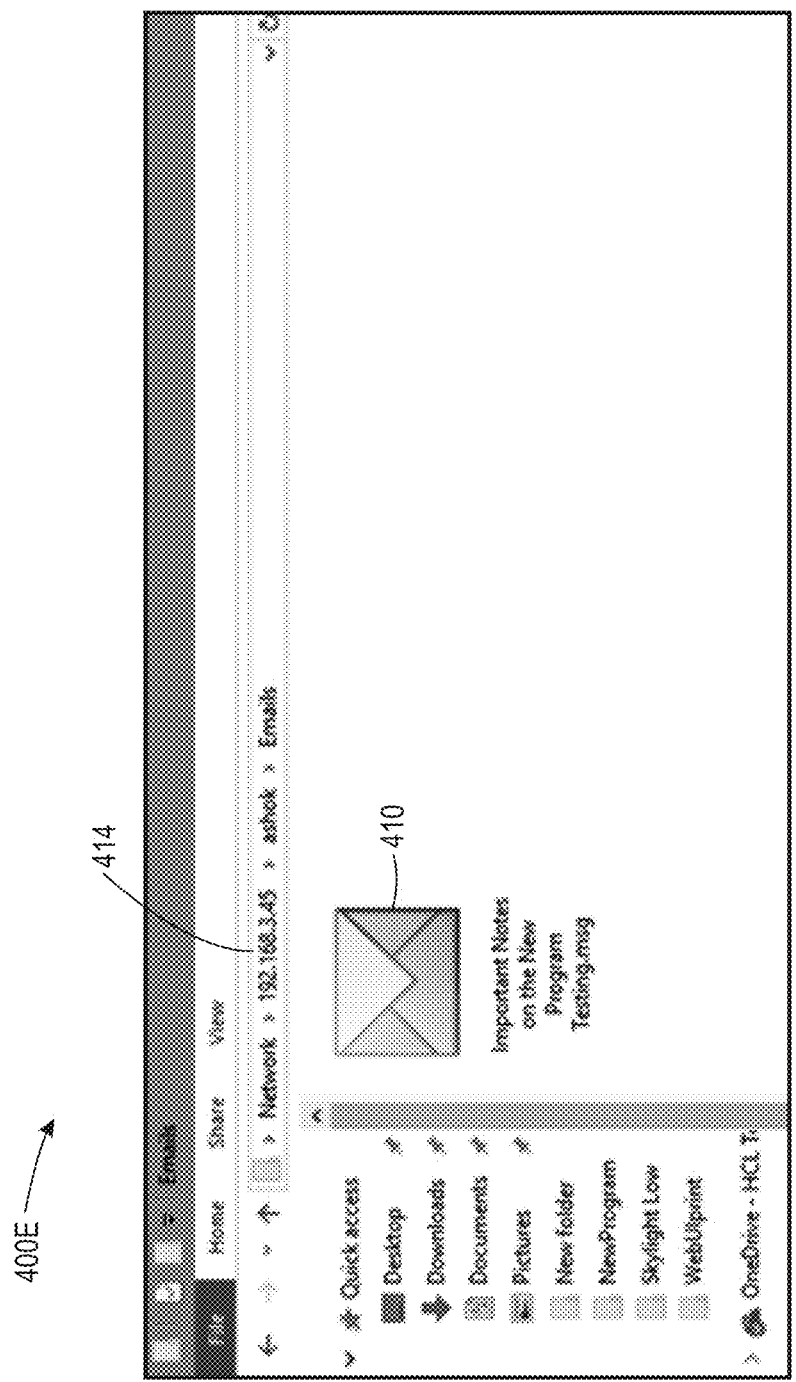

The screenshot 400D of FIG. 4D shows the email file 410 saved in a USB device (i.e., an external storage device) 412. In such cases, the user copies the email from his computing device 204 and saves the email as the email file in the USB device 412. The screenshot 400E of FIG. 4E illustrates the email file 410 saved in a file location such as network shared path (marked as 414). In an exemplary scenario, from the email client 402, the user 202 can select a combination keys Alt+F+A and then choose the path/file location where the user 202 wants to save the email as the email file 410.

Figure 4F:
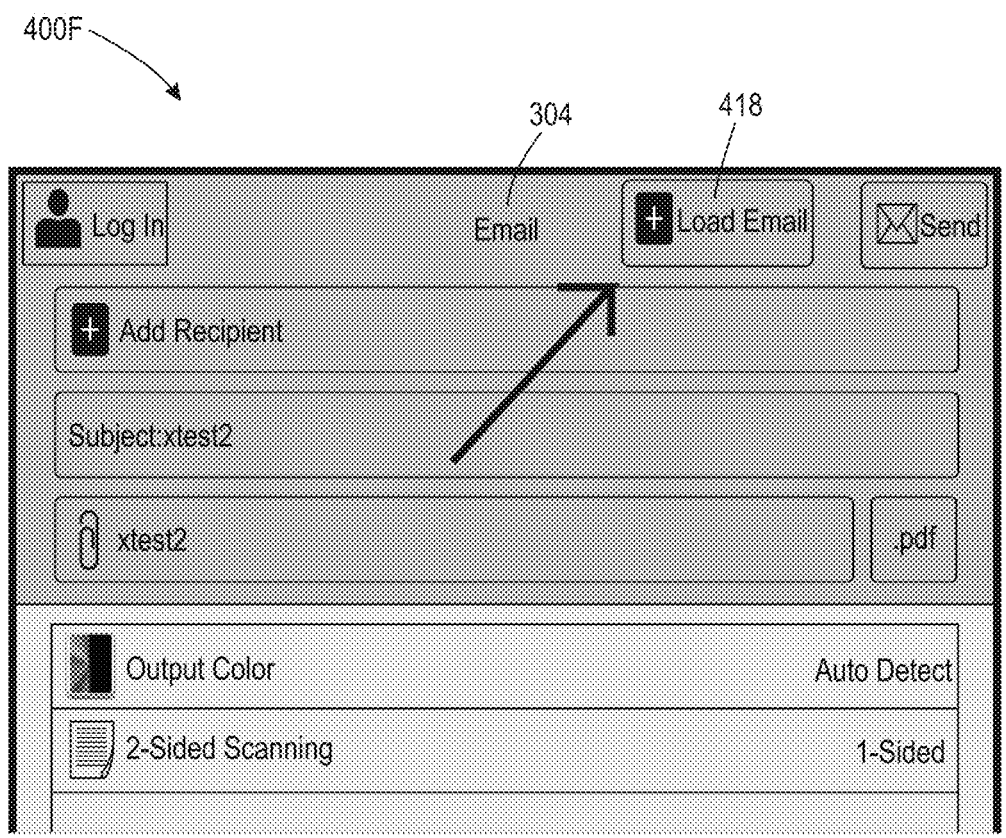

The screenshot 400F of FIG. 4F illustrates the user interface 304 of the multi-function device 100. A pre-defined option such as "load email" 418 is displayed to the user 202. The user 202 selects the option 418 for loading the email file 410 from the USB device 412 or through a shared file location 414. Upon selecting the option 418, more options are displayed to the user 202 as shown in FIG. 4G.

Figure 4G:
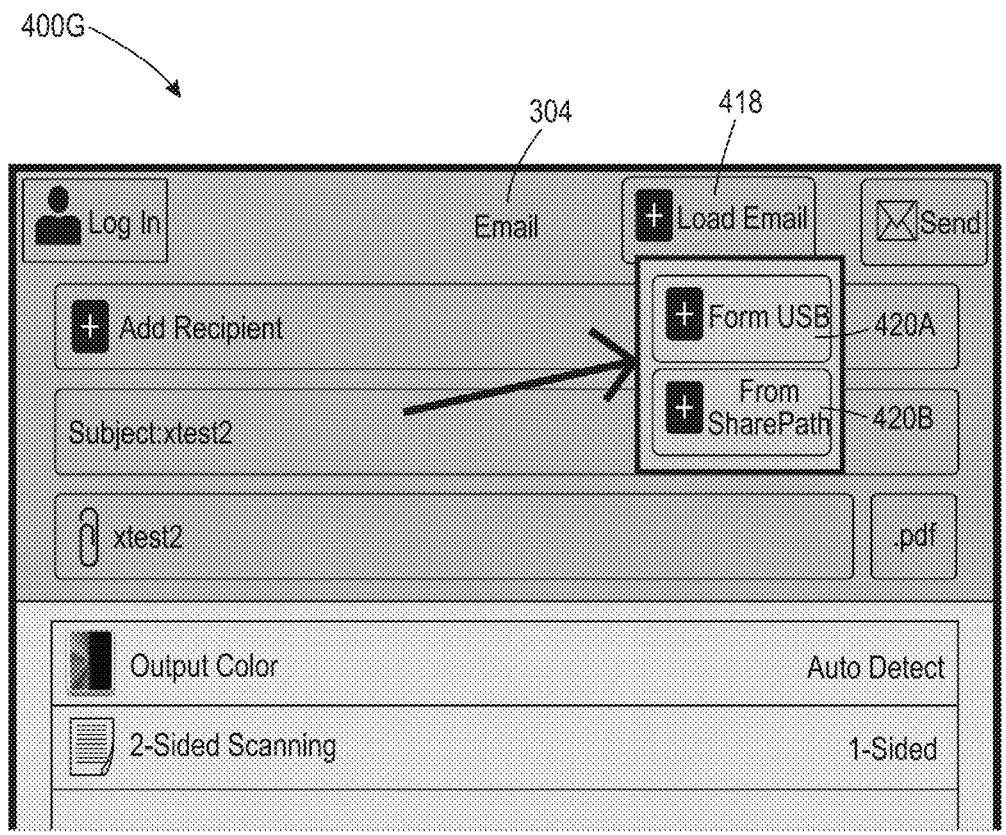
Figure 4H:
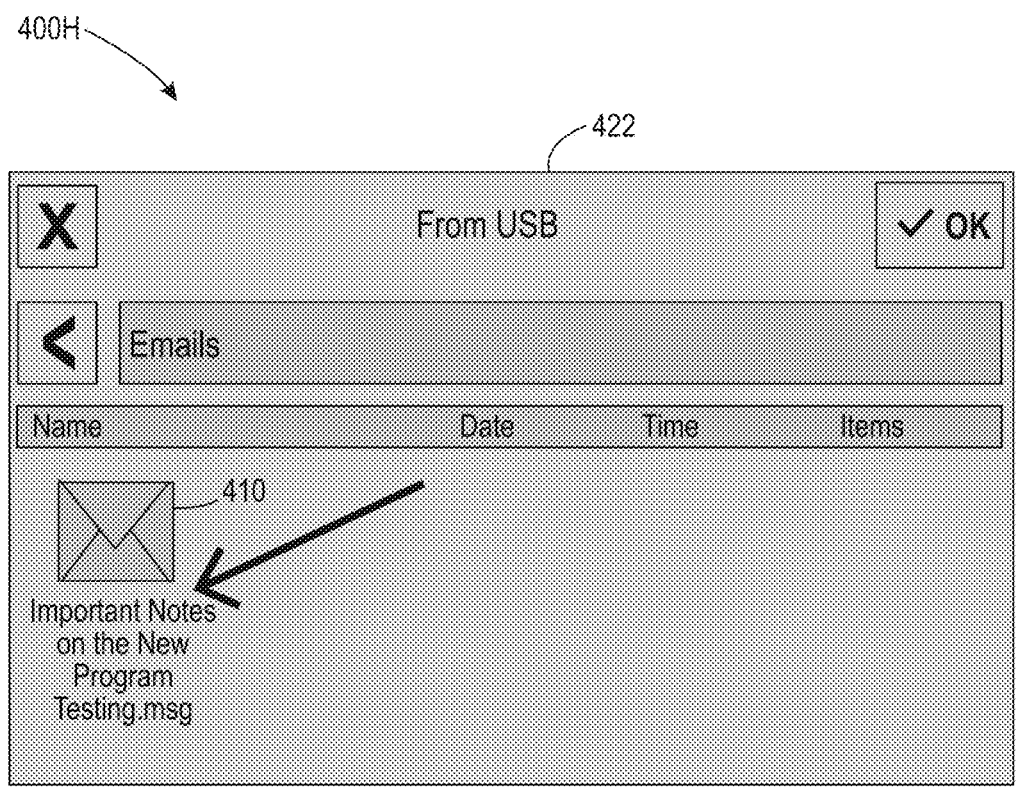

The screenshot 400G of FIG. 4G shows two options, i.e., a From USB option 420A and a file location option, for example, a From Share Path option 420B to the user 202. The options 420A and 420B are displayed to the user 202 after the user 202 selects the option 418.

The user 202 may select one of the two options 420A-420B. If the user 202 selects the option 420A, i.e., From USB option, a screen 422 is shown in the screenshot 400H of FIG. 4H. The screen 422 lists the email file 410 in a .msg format. On selecting the From USB option 420A, the screen 422 allows the user 202 to select the email file 410. Likewise, if the user 202 selects the option 420B, i.e., From Share Path option, a screen (although not shown) is displayed to the user 202, the user 202 can browse through the share path/file location and then select the email file 410 from the share path/file location.

The user 202 can select the email file 410 based on the name and click OK to auto add the one or more recipients 408, the email content 406 including the email subject and email body.

Figure 4I:
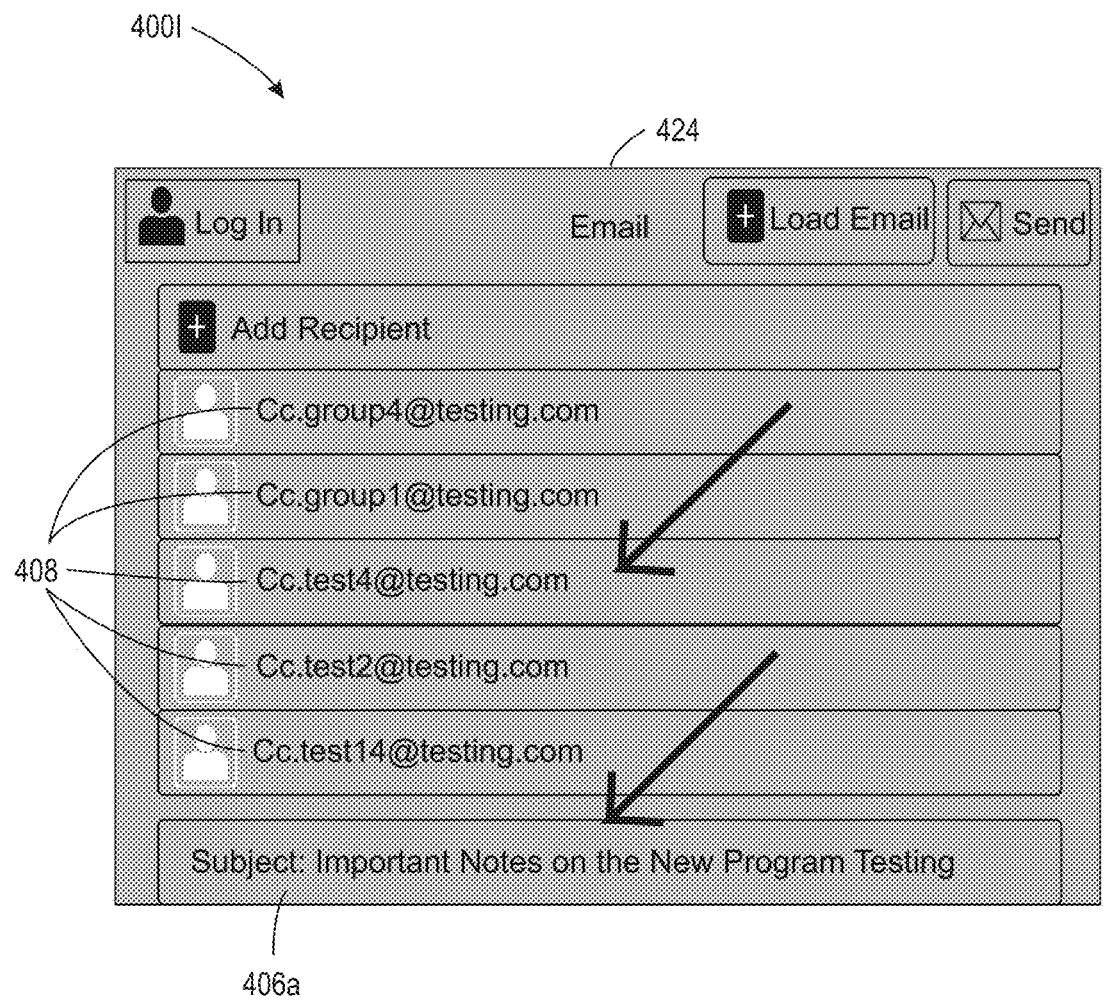

As shown in the screenshot 400I in FIG. 4I, on selecting the email file 410, the email content 406 such as email subject 406a and the one or more recipients 408 of the email file 410 are automatically filled using email app as an email job 424 and are displayed to the user 202 through the user interface 304 at the multi-function device 100. In some embodiments, the user 202 can edit the one or more recipients 408 and/or the email content 406 via the user interface 304. The user 202 scans one or more documents. The multi-function device 100 automatically attaches the scanned documents to the email job 424. The user 202 finalizes the email via the user interface 304 and sends the email job 424 along with the attachment from the multi-function device 100 to the one or more recipients 408. The one or more recipients 408 receive the email content and the scanned document as an attachment in a single email.

Figure 5A:
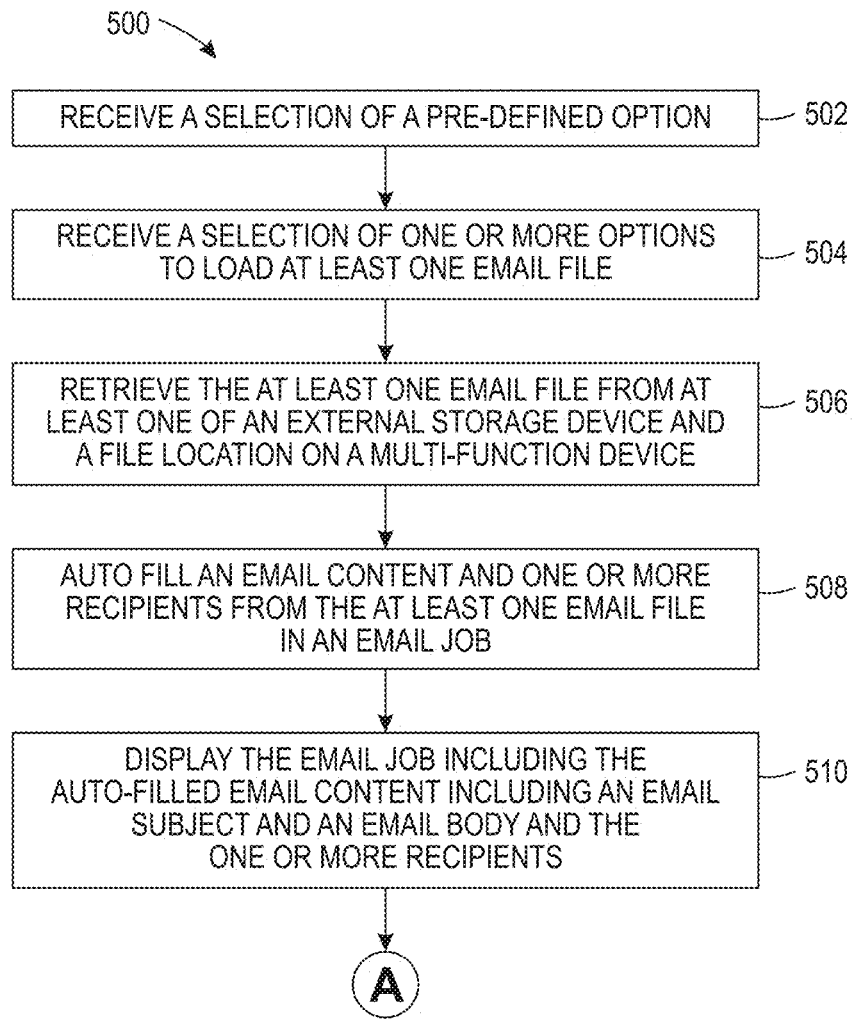
FIGS. 5A-5B represent a method flowchart for sending an email along with a scanned document directly through the multi-function device, in accordance with an embodiment of the present disclosure.
Figure 5B:
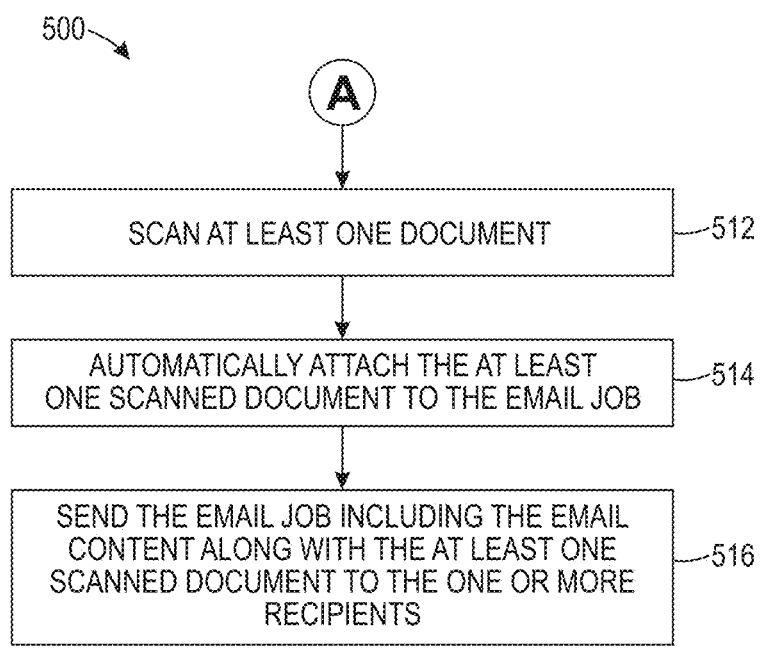

FIGS. 5A-5B represent a flowchart illustrating a method 500 for sending a scanned document attached with a required email directly through a multi-function device. To this end, the method includes importing an email file having email content and one or more recipients in an email job in the multi-function device, attaching a scanned document and sending the scanned document along with the email content to the one or more recipients.

The method begins when a user wishes to send an email to one or more recipients but also wants to send a document after scanning along with the email. The user first creates the email at his computing device and accesses the created email at the multi-function device and then scans a document. The scanned document is automatically attached to the email in an email job. Finally, the email along with the scanned document is sent through the multi-function device.

Initially, a user creates an email using an email client running on a computing device. One example of the email client may be MS Outlook without limiting the scope of the disclosure. The email includes an email body, an email subject and one or more recipients. After creating, the email is saved in the form of a draft. Then, the user copies the email from the draft and saves the email as an email file in at least one of an external storage device and a file location. The email file includes the email content and one or more recipients. The email content further includes an email subject and an email body. In this way, the email file is stored in at least one of the external storage device and the file location. The email is ready to be sent but a scanned document needs to be attached. The email file is stored in a pre-defined format such as ".msg". Other formats for the storing the email file may be but not limited to, ".mbox", or ".eml". The pre-defined format of the email file may be based on an operating system running on the computing device 204. The pre-defined format of the email file may be based on the email client like Gmail, MS Outlook, etc., that the user is using.

The user then accesses the multi-function device to access the at least one email file. The user logs in into the multi-function device using a username and/or password. The multi-function device authenticates the user based on the username and/or password. After successful authentication, access to the multi-function device is provided to the user. In particular, access to a user interface (also referred to as a local user interface) is provided to the user. Then, at 502, a pre-defined option such as "Load File" option is selected by the user and the selection of the pre-defined option is received. The pre-defined option is received to automatically fill the at least one email file in the user interface of the multi-function device.

After selecting the pre-defined option, one or more options are displayed to the user. The one or more options include load an email file from an external storage device and/or load an email file from a file location. The user selects an option of the displayed options. The option selected by the user is received at 504. The selection of the at least one email file from the at least one of external storage device and the file location is received. The file location option allows the user to provide a path or location of the file for accessing the at least one email file from the file location. For example, when the user selects the external storage device option, then the user interface opens a screen showing contents of an external storage device, like a USB device, connected to the multi-function device opens, allowing the user to select the at least one email file. The user selects the at least one email file. The user may connect the external storage device to a port of the multi-function device for accessing the at least one email file if the user wishes to upload the at least one email file from the external storage device like a USB device. Similarly, when the user selects the file location option, then the user interface opens a screen opens up to allow the user to either enter a file location address or browse to the file location.

Based on the selected option, the at least one email file is retrieved either from the external storage device or from the file location at 506. The at least one email file is created at the computing device. The at least one email file includes the email content and the one or more recipients. The block 506 is implemented by a controller. The at least one email file is automatically opened using an email app as an email job. At 508, the email content and the one or more recipients from the at least one email file is automatically filled or loaded in an email job. The block 508 is implemented by an email module. After loading, the email job including the auto-filled email content having the email subject, the email body and the one or more recipients is displayed to the user via the user interface, at 510. In some embodiments, the user can add the email file as an attachment in the email job.

The user then selects an option to scan a document. The user places the document for scanning. The user places the document on platen of the multi-function device and gives a scan command for scanning the document. The document is scanned, and a scanned document is generated at 512. The block 512 is implemented by a scanner of the multi-function device. After successful scanning, the scanned document is automatically attached to the email job at 514. The block 514 is implemented by the email module. Then, the email job having the email content along with the scanned document is sent to the one or more recipients at 516. The block 516 is implemented by the email module of the multi-function device. The user may select or give a send command for sending the email. Before sending, the user can edit the email body, email subject and/or the one or more recipients. In one example, the email body can be edited through the user interface. In another example, the email subject may be edited through the user interface. In further example, the one or more recipients may be edited through the user interface.

The method 500 is implemented by the multi-function device. In some implementations, the method 500 can be implemented by various components of the multi-function device as discussed above. The method 500 may be implemented by a non-transitory computer-readable medium storing instruction, the instructions which, when executed by one or more processors, cause the one or more processors to implement the method blocks 502, 504, 506, 508, 510, 512, 514 and 516.

The present disclosure is implemented for scenarios when a user wants to send an email having email content to one or more recipients but also needs to attach one or more documents by scanning them. As a result, the present disclosure provides access to the email created by the user at the multi-function device and automatically attaches the documents to the email after scanning and finally sends to the recipients.

Exemplary Scenario

The present disclosure is implemented for scenarios when a user wishes to send an email but also wishes to attach one or more scanned documents to the email to be sent. The scanned documents are to be obtained after scanning. In such cases the user first prepares the email using an email client in a computing device like a personal computer. The email is prepared and is saved as a draft. The user then copies the email from the draft and saves the email as an email file in an external storage device or a file location (e.g., Share Path). After this, the user goes to a multi-function device (MFD), authenticates himself/herself to access the multi-function device. After successful authentication, the user opens an email app on the multi-function device. The user selects a Load File option displayed in the user interface. On selecting the Load File option, the user gets options, i.e., an external storage device option and a file location option, to load the email file either from the external storage option and the file location. The file location is shared path where the email file can be placed. The file location may be accessed through one or more scan templates that the user is created using suitable protocols like SMB protocol, FTP, etc. In the external storage option, the user connects the external storage device having the email file to the multi-function device. The user selects either an option of the displayed option and based on the selection of the email file stored in the external storage or in the file location gets listed for the user. The user selects the relevant email file based on a name and click an OK option. Upon selecting the email file, the email content and the one or more recipients that the user created using the email client gets loaded in an email job. The email content including the recipients, email subject, email body are automatically filled in the email job. In some embodiments, the user adds the email file as an attachment to the email job. The user then scans one or more documents. For scanning, the user places the documents on platen. After scanning, the scanned documents are automatically attached to the email job having the email content. As a result, the user does not need to go back to the computing device to attach the scanned document to his email job as the email is readily available with the user at the multi-function device. Finally, the user sends the email job to the one or more recipients.

The present disclosure discloses methods and systems for sending an email job along with a scanned document directly through a multi-function device. The methods and systems enable a user (i) to import an email file in an email job in the multi-function device, (ii) to attach a document after scanning to the email job, and (iii) send the email job with the attached scanned document to recipients. In this manner, the user does not require to go back to a computing device for attaching the scanned document to this email job as the email job is directly provided or available at the multi-function device. The methods and systems accept email files in all suitable formats uploaded to the multi-function device. The methods and systems enable better tracking of emails and simplify users work in having email sent with the attachments, i.e., scanned documents. The methods and systems enable the user to manage the emails in a better way. The systems and methods and systems also provide user convenience. The methods and systems automatically integrate scanned documents into an email including email content and sent to one or more recipients. In all, the methods and systems enable the user to send the email with scanned documents without bouncing back and forth between a computing device like a personal computer, and the multi-function device.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "displaying," or "filling," or "receiving," or "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for sending an email along with a scanned document through a multi-function device, comprising:
   storing at least one email as an at least one email file in at least one of an external storage device and a file location, wherein the at least one email is created by a user at a computing device;
   receiving a selection, through a user interface of the multi-function device, of the at least one email file;
   identifying, at the multi-function device, a format of the at least one email file as an email file format;
   retrieving, by a controller, the at least one email file from the at least one of an external storage device and a file location;

automatically filling, based on the identification of the email file format of the at least one email file, by an email module, in an email job, an email content and one or more recipients from the at least one retrieved email file;

displaying, via a user interface, the email job comprising the auto-filled email content comprising an email subject and an email body, and the one or more recipients;

scanning, by a scanner of the multi-function device, at least one document;

automatically attaching, by the email module, the at least one scanned document to the displayed email job; and sending, by the email module, the email job comprising the email content along with the at least one scanned document to the one or more recipients directly through the multi-function device.

2. The method of claim 1, wherein the email file format of the at least one email file is a pre-defined format, wherein the pre-defined format of each of the at least one email file comprises one of a ".msg" format, a ".mbox" format, and a ".eml" format.

3. The method of claim 1, further comprising providing access to the at least one email file via a user interface of the multi-function device using an email app.

4. The method of claim 1, further comprising receiving a selection of a pre-defined option to automatically fill the at least one email file in the email job in the user interface of the multi-function device.

5. The method of claim 1, further comprising receiving a selection of the at least one email file from the at least one of an external storage device and a file location.

6. The method of claim 2, further comprising identifying the pre-defined format of the at least one email file.

7. The method of claim 1, further comprising automatically opening the at least one email file as the email job using an email app.

8. The method of claim 1, further comprising updating at least one of the email content and the one or more recipients via the user interface, based on an input from the user.

9. The method of claim 1, further comprising authenticating the user to access to the multi-function device.

10. The method of claim 1, further comprising receiving the at least one document for scanning.

11. A multi-function device, comprising:
a controller to retrieve at least one email file from at least one of an external storage device and a file location, wherein a user creates the at least one email file at a computing device;
a scanner to scan at least one document;
an email module to:
receive a selection, through a user interface of the multi-function device, of the at least one email file;
identify, at the multi-function device, a format of the at least one email file as an email file format;
automatically fill, based on the identification of the email file format of the at least one email file, in an email job, an email content and one or more recipients from the at least one retrieved email file;
automatically attach the at least one scanned document to the email job;
send the email job comprising the email content along with the at least one scanned document to the one or more recipients; and
a user interface to display the email job comprising the auto-filled email content comprising an email subject and an email body, and the one or more recipients.

12. The multi-function device of claim 11, wherein the email file format is a pre-defined format, wherein the pre-defined format of each of the at least one email file comprises one of a ".msg" format, a ".mbox" format, and a ".eml" format.

13. The multi-function device of claim 11, wherein the at least one email file is stored in the at least one of an external storage device and a file location.

14. The multi-function device of claim 11, wherein the email module automatically opens the at least one email file using an email app.

15. The multi-function device of claim 11, wherein the user interface receives a selection of a pre-defined option to automatically fill the at least one email file in the email job in the user interface of the multi-function device.

16. The multi-function device of claim 11, wherein the user interface receives a selection of the at least one email file from the at least one of an external storage device and a file location.

17. The multi-function device of claim 12, wherein the email module identifies the pre-defined format of the at least one email file.

18. The multi-function device of claim 11, wherein the email module automatically opens the at least one email file as an email job using an email app.

19. The multi-function device of claim 11, wherein the email module allows the user to update the one or more recipients via the user interface.

20. The multi-function device of claim 11, wherein email module allows the user to update the email content via the user interface.

21. The multi-function device of claim 11, wherein the scanner receives the at least one document for scanning.

22. A multi-function device enabling a user to directly send a scanned document along with a required email, by:
storing at least one email as an at least one email file in at least one of an external storage device and a file location, wherein the at least one email is created by a user at a computing device;
receiving a selection of a pre-defined option to automatically fill the at least one email file in a user interface of the multi-function device;
identifying, at the multi-function device, a format of the at least one email file as an email file format;
retrieving the at least one email file from the at least one of an external storage device and a file location;
automatically filling based on the identification of the email file format of the at least one email file, in an email job, an email content and one or more recipients from the at least one retrieved email file;
displaying the email job comprising the auto-filled email content and the one or more recipients;
receiving at least one document for scanning;
scanning the at least one document;
automatically attaching the at least one scanned document to the email job comprising the email content and the one or more recipients; and
sending the email job comprising the email content with the attached at least one scanned document to the one or more recipients, without requiring the user to bounce back between the multi-function device and the computing device.

23. The multi-function device of claim 22, automatically opens the at least one email file as the email job using an email app.

* * * * *